United States Patent

[11] 3,622,209

| [72] | Inventor | John F. Leyden<br>Poughkeepsie, N.Y. |
|---|---|---|
| [21] | Appl. No. | 869,679 |
| [22] | Filed | Oct. 27, 1969 |
| [45] | Patented | Nov. 23, 1971 |
| [73] | Assignee | Chemical Rubber Products, Inc.<br>Beacon, N.Y. |

[54] VEHICLE DRIVE TRACK
10 Claims, 4 Drawing Figs.

[52] U.S. Cl. .................................................. 305/38,
198/193
[51] Int. Cl. ...................................................... B62d 55/24
[50] Field of Search .......................................... 305/37, 38,
3.5 EB; 74/237; 198/193

[56] References Cited
UNITED STATES PATENTS
2,476,828  7/1949  Skromme ..................... 305/38

| 2,899,242 | 8/1959 | Bombardier | 305/38 |
| 3,105,536 | 10/1963 | Cappa | 305/35 X EB |
| 3,144,930 | 8/1964 | Michels | 74/237 X |
| 3,285,677 | 11/1966 | Marier | 305/38 |
| 3,464,743 | 9/1969 | Hallaman | 305/35 EB |
| 3,480,339 | 11/1969 | Kell | 305/35 EB |
| 3,498,684 | 3/1970 | Hallaman | 305/38 |

Primary Examiner—Richard J. Johnson
Attorneys—John L. Hutchinson, William Lohff and Alan M. Abrams ABSTRACT: A drive track for vehicles such as snowmobiles comprising a flexible endless belt containing flexible stiffening members composed of wire fabric which maintain the belt in uniform gripping contact with the ground or snow while simultaneously permitting localized flexibility allowing for uneven terrain and cushioning for concentrated loading caused by immovable or nonyielding objects such as stones or tree stumps.

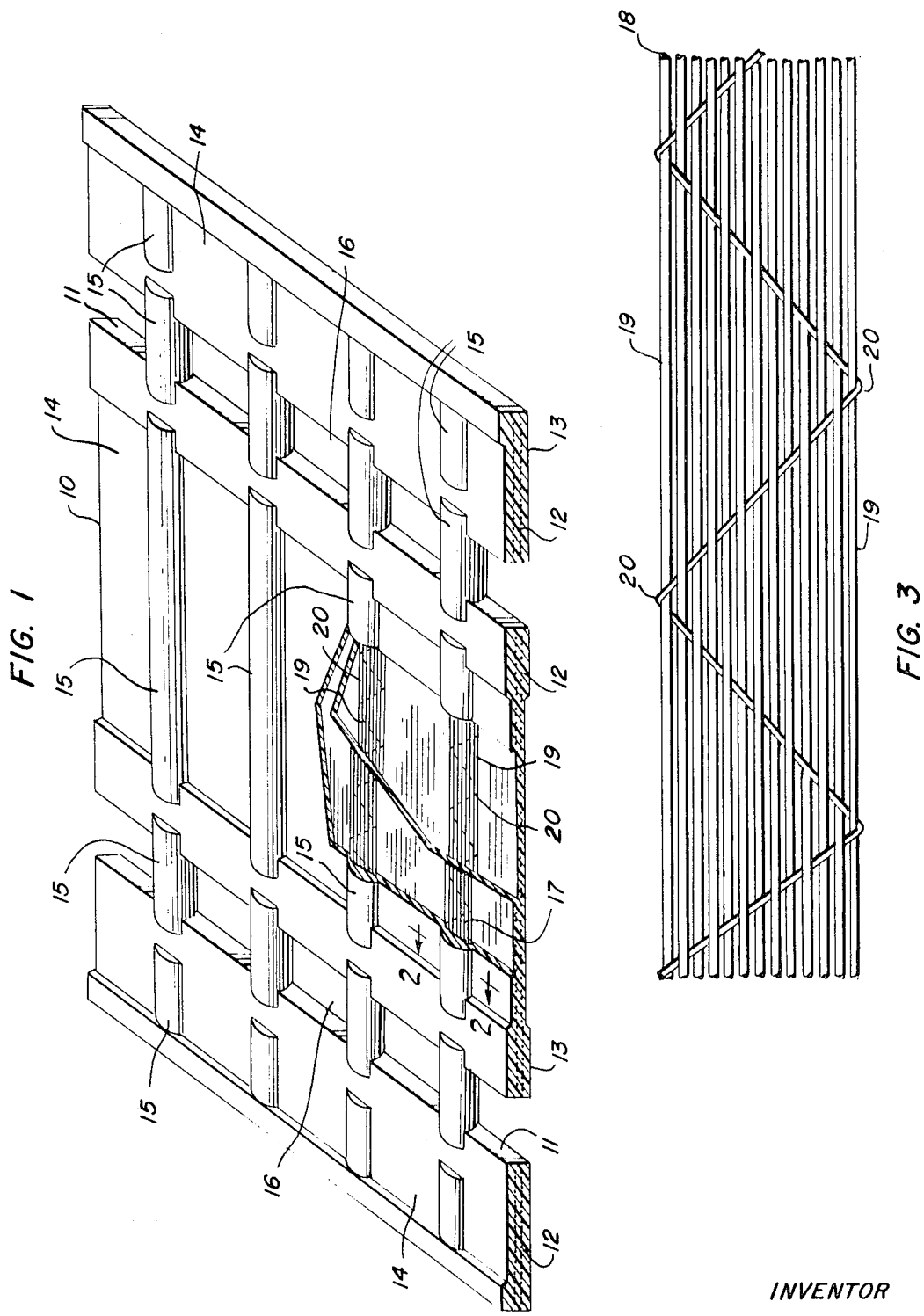

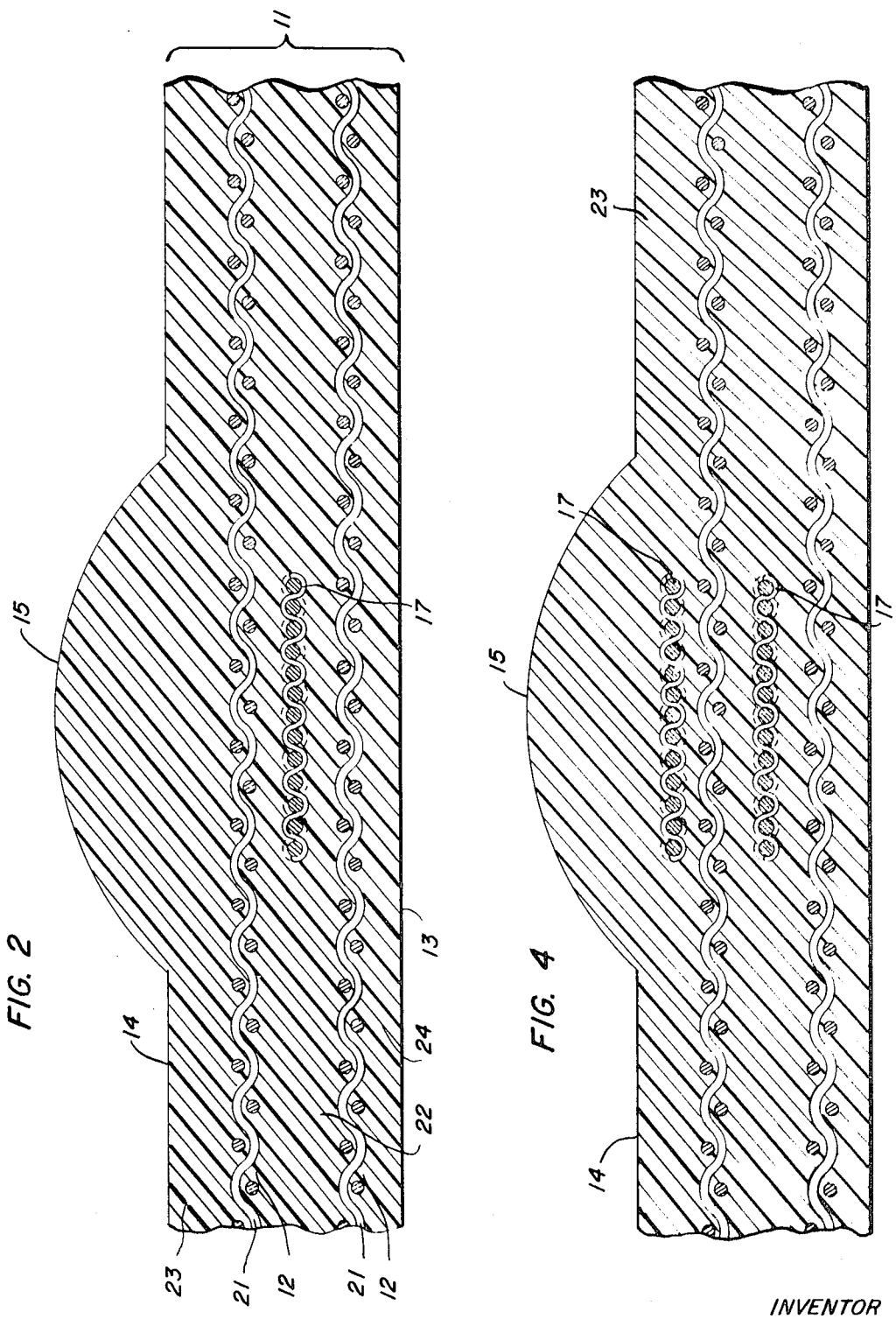

VEHICLE DRIVE TRACK

This invention relates to drive tracks for self-laying track-type vehicles. One vehicle of this type is the familiar snowmobile or motorized sled which is propelled over snow or the ground on an endless belt typically moved by a sprocket drive. These motorized sleds or snowmobiles have met with considerable success and provide a particularly advantageous means of transportation over snow-covered terrain. Full and effective utilization of these track-laying vehicles is, however, somewhat retarded by one problem associated with the drive track or endless belt employed to propel such vehicles over the ground or snow.

The snowy terrain over which these vehicles travel quite often is uneven and moreover is often interlaced with immovable objects such as tree stumps or large rocks. So as to provide the necessary friction traction over the uneven snow and to provide a yielding cushion action when passing over immovable objects, the belts employed as the drive track for these vehicles must, of necessity, be flexible. This essential flexibility, however, provides certain operational problems. Foremost of these is that during movement of the belt particularly at elevated speeds, the belt, due to its flexibility, tends to flex concavely away from the ground or snowy surface over which the belt is traveling. This greatly decreases the contact area of the belt with the snow which adversely affects both the load carrying capacity and the friction gripping ability of the belt with the ground or snow surface.

While this physical characteristic of the drive track or belt is particularly undesirable, such characteristic has nevertheless generally been accepted as a necessary and unavoidable inherent limitation of the flexible drive track. Any stiffening of the belt to prevent the undesirable concaving obviously would detract from its essential requirements, namely, sufficient flexibility to uniformly grip uneven ground surfaces and to flexibly cushion shock when passing over unyielding objects.

Accordingly, an object of this invention is to provide a flexible drive track for track-laying vehicles which avoids the problems heretofore encountered with such drive tracks. Another object is to provide a drive track for such vehicles comprising a belt which is sufficiently flexible so as to uniformly engage uneven terrain and cushion shock yet which is also sufficiently stiff so as to prevent any undesirable concaving of the belt away from the ground during movement. These and other objects of this invention will be apparent from the further following detailed description thereof as well as from the attached drawings.

IN THE DRAWINGS

FIG. 1 is a perspective view of a fragment of the drive track according to this invention parts of which are sectioned and broken away.

FIG. 2 is a section taken along line 2—2 of FIG. 1 and exaggerated.

FIG. 3 is a plan view of a flexible stiffening member illustrating the metal fabric components.

FIG. 4 is a section illustrating another embodiment of the invention analogous to the section of FIG. 2.

Referring to FIG. 1, the drive track according to this invention is illustrated as belt 10 composed essentially of a flexible body or carcass 11, preferably fabricated from a plurality of elastomerized fabric layers 12, having a face 13 adapted to receive driving movement and a ground-engaging face 14 over which are preferably disposed raised lugs or cleats 15. Longitudinally spaced along the marginal sides of belt 10 are apertures 16 extending through the face 13 and body 11 and adapted to receive and cooperate with sprocket teeth (not shown) for driving the belt 10. While the belt 10 is shown of a limited length, it is typically of endless construction of a number of finite lengths cooperatively linked together by conventional linking means (not shown). Interior the belt 10 are disposed a series of flexible stiffening members 17, one embodiment of which is illustrated in enlarged form in FIG. 3. Flexible stiffening member 17 is illustrated therein as a metal fabric 18 of a plurality of warp wires 19 which are disposed transverse to the belt 10 and woven together by a weft or filler wire 20.

As indicated, concave flexing of the flexible belts employed as drive tracks for track-laying vehicles poses a serious problem limiting the effectiveness of such vehicles. Further, as indicated, the problem of the concave flexing of the belt away from the ground is not readily avoided by a stiffening of the belt by conventional stiffening means because such stiffening adversely affects the desired and essential flexibility of the belt. Such flexibility is, of course, necessary for successful operation of the belt over uneven terrain and to cushion against shock or concentrated loading caused by nonyielding objects such as large rocks.

This problem is, however, substantially avoided and lessened according to this invention through utilization of flexible stiffening members 17 as typified by metal fabric 18. This metal fabric 18 by virtue of its being composed of a plurality of warp wires 19 transverse to the belt 10 has an overall effect of providing a cumulative transverse stiffness to the belt 10. However, because the metal fabric 18 is composed of a plurality of relatively independently acting warp wires 19, it also has a tendency to remain somewhat flexible particularly in localized sections of the belt 10. This localized flexibility permits the belt 10 to adjust for any uneven localized ground surface in contact with the belt and permits yielding cushioning for the belt 10 for any localized concentrated loading caused by nonyielding objects such as rocks.

The metal fabric 18 preferably employed as the flexible stiffening member 17 of this invention can appropriately be constructed according to a number of different arrangements and yet achieve the desired stiffening effect without substantially destroying the localized flexibility of the belt 10. FIG. 3 illustrates a preferred form of the metal fabric 18 and specifically shows a plurality of wires 19 forming the warp of such metal fabric and which when incorporated into the belt 10 are disposed transversely to the moving or longitudinal direction of the belt 10. A single weft or filler wire 20 binds or weaves the warp wires 19 together. While any number of weft or filler wires 20 may be employed, it is preferred that only a single wire be utilized and particularly a weft wire 20 having a diameter smaller than that of the warp wires 19. This construction is particularly desirable in that it allows a high degree of independent movement for the warp wires 19 which maximizes the localized flexibility and at the same time maintains a cooperative association of the warp wires 19 to assure a cumulative transverse stiffening effect for the belt 10. The employment of a single weft wire 20 with a diameter smaller than that of the warp wires 19 serves to increase this desirable effect in that the smaller diameter weft or filler wire 20 allows even greater independent movement for the warp wires 19.

The specific construction of the metal fabric 18 can be considerably varied. Generally, however, to achieve the desired stiffening with simultaneous localized flexibility, the metal fabric 18 must essentially be composed of a plurality of individual warp wires 19. The number of such warp wires 19 employed in any particular instance in the metal fabric 18 will be a function of several variables such as the type of metal used for the wires, the diameter of the wire, and if used, the type and diameter size of filler wire 20 as well as the specific method employed for weaving the metal fabric 18. For example, again in reference to FIG. 3, a particularly suitable wire fabric 18 can consist of 13 warp wires 19 each of brass-plated steel having a diameter of 0.037 inches woven together by a single weft or filler wire 20 of the same type of metal but having a smaller diameter of approximately 0.014 inches.

Other types of the metal fabric can, of course, be employed. For example, metal fabric 18 can, if desired, be weftless; that is, the fabric may be devoid of any weft or filler wires 20 holding the warp wires 19 together. Also, the warp wires 19 instead of preferably being individual rounded wires can be composed of braids of much smaller diameter wires or flat strips having dimensions comparable to the rounded wires discussed above.

The belt 10 of the drive track according to this invention, within which the flexible stiffening members 17 such as metal fabric 18 are incorporated can, in general, include any of the conventional flexible belts typically employed as the endless drive track for track-laying vehicles. As shown in FIGS. 1 and 2, exaggerated in FIG. 2, the belt 10 is suitably composed of a plurality of elastomerized fabric layers 12 which have been joined into a unitary body or carcass 11 through conventional manufacturing means such as by application of elevated temperature and pressure. The fabric 21 of the elastomerized fabric layer 12 can be composed of any of the woven fabrics typically employed for reinforcing purposes including both natural and synthetic fibers such as cotton or nylon. The fabric layer 12 is elastomerized by either coating and/or impregnating the fabric 21 with conventional resilient elastomeric materials which include rubbery materials such as natural or synthetic rubbers, for example, polybutadiene.

The belt 10 can be composed of any number of elastomerized fabric layers 12 and as illustrated in FIGS. 1 and 2 is shown composed simply of two fabric layers 12. The belt 10 can, in addition to the fabric layers 12 have other layers, for example, a skim layer of rubbery material 22 located between the two elastomerized fabric layers 12 as well as cover layers 23 and 24 forming respectively at their outer surfaces ground-engaging face 14 and movement-receiving face 13. These rubbery layers 23 and 24 serve to achieve various objectives such as improved flexibility and wearability. The drive track as shown embodied by belt 10 has a ground-gripping face 14 which friction contacts the ground or snow and preferably has, as shown, a plurality of raised portions or cleats 15 which assist in the friction gripping. These cleats are typically of rubbery material and conventionally are integrally connected such as by molding to the ground-gripping face 14.

As is conventional for drive tracks such as belt 10, there is a face 13 adapted to receive driving movement so as to move the belt 10 in the desired direction and thus propel the track-laying vehicle (not shown) over the ground or snow. As shown in FIG. 1, face 13 is provided with apertures 16 through the carcass 11 and in longitudinal disposition preferably along both marginal edges of belt 10. Apertures 16 are adapted to receive and cooperate with sprocket teeth so as to provide a driving communication between the belt 10 and a sprocket drive system (not shown). Other suitable drive systems may, of course, be employed such as rollers or pulleys (not shown) in which case the spaced apertures 16 are not necessary and the face 13 may be appropriately adapted to cooperate with such devices.

The particular location of the flexible stiffening members 17 such as metal fabric 18 according to this invention within the thickness of the belt 10 can be varied somewhat with the optimum location being dependent upon such variables as the particular construction of the belt 10 such as the number of elastomerized fabric layers 12 and their materials of construction. Generally, however, for belts such as belt 10 illustrated in FIGS. 1 and 2, a desirable location for the flexible stiffening member 17 within the thickness of belt 10 is between two elastomerized fabric layers 12 and preferably within skim layer 22.

The particular longitudinal positioning of the flexible stiffening members 17 along the lengthwise or moving direction of the belt 10 also can be varied with the most desirable positioning being dependent upon the particular location of the stiffening member 17 within the thickness of the belt 10, the number of flexible stiffening members 17 employed per unit length of the belt 10 and their specific construction. Generally, however, a particularly preferred longitudinal positioning for the stiffening member 17 is in a spaced relationship to the cleats 15 especially with a single flexible stiffening member 17 being located below each or every other cleat 15. Longitudinal placement of the flexible stiffening members 17, at such positions, serves to utilize and take advantage of the natural transverse stiffening effect produced by the cleats 15 particularly when such cleats are disposed substantially continuously and transversely across the belt 10. However, when there are no cleats 15 on the ground-engaging face 14 or especially when such cleats are not disposed uniformly and substantially transverse to the belt 10, then the flexible stiffening members 17 may, if desired, be located at other longitudinally spaced positions. For example, the flexible stiffening member 17 may be located longitudinally in the sections of the belt 10 intermediate to the cleats 15.

Other and desirable embodiments relating to the number of flexible stiffening members 17 and their longitudinally positioning may be provided by having at least two series of flexible stiffening members 17 of the same or different type such as metal fabric 18 illustrated in FIG. 3 located in a stacked arrangement within the belt 10 with one series spaced above the other. Such an arrangement is illustrated in FIG. 4 where the flexible stiffening members 17 of a second series are spaced above a first series both in a spaced relationship to cleat 15.

Advantageously, the second series of flexible stiffening members 17 is located in the elastomeric coating 23, the upper surface of which constitutes ground-gripping face 14. Again, as in the case where there is only one series of flexible stiffening members 17, a preferred longitudinal positioning for the second series of flexible stiffening members 17 is directly below each or every other cleat 15 particularly when such cleats are uniformly and substantially continuously transversely deposed on ground-gripping face 14.

The drive track of this invention as exemplified by belt 10 can be prepared according to a number of manufacturing techniques. For example, in reference to belt 10 of FIGS. 2 and 3, the metal fabric 18 as the flexible stiffening member 17 can be suitable embedded in a rubbery skim layer 22 by calendering or the like. Wires 19 and 20 of metal fabric 18 should advantageously be compatible with such rubber skim layer 22. Accordingly, such wires may be provided with a suitable rubber adhering finish, for example, a brass or adhesive coating, to bind the wires to the rubbery skim layer 22. Elastomerized fabric layers 12 can then be applied to the top and bottom of the skim layers 22 by application of heat and pressure and thereafter cover layers 23 and 24 applied and the laminate preform thus prepared then can be pressure molded to unitary body 11 and to simultaneously form cleats 15 and aperatures 16.

I claim:

1. A drive track comprising in combination a flexible belt having a ground-engaging face and a face adapted to receive driving movement and at least one series of flexible stiffening members spaced from each other within the belt, and disposed transversely to the belt which maintains the ground-engaging face in uniform contact with the ground while simultaneously permitting flexibility, each of said flexible stiffening members comprising a plurality of metal wires which are disposed transversely to the belt and are contained in a metal fabric where such wires constitute the warp of the fabric and are woven together by a single filler wire having a diameter smaller than the warp wires.

2. The drive track of claim 1 wherein there are two series of flexible stiffening members within the belt in a stacked arrangement with one series disposed above the other.

3. The drive track of claim 1 wherein the belt is adapted to receive driving motion by having longitudinally spaced apertures adapted to receive and cooperate with sprocket teeth for effecting a driving relationship between the belt and such sprocket teeth.

4. The drive track of claim 1 wherein the ground-engaging face is equipped with a series of raised cleats integral with the belt and adapted to grip the ground.

5. The drive track of claim 4 wherein at least a portion of the flexible stiffening members are in a longitudinally spaced relationship below the cleats.

6. The drive track of claim 1 wherein the belt comprises at least two elastomerized fabric layers and at least one series of the flexible stiffening members is located within the belt between two of such fabric layers.

7. The drive track of claim 6 wherein a second series of flexible stiffening members is located between one fabric layer and the ground-engaging face.

8. The drive track of claim 1 comprising in combination a flexible belt having a face adapted to receive driving movement and composed of at least two elastomerized fabric layers and having a ground-engaging face equipped with raised cleats, at least one series of flexible stiffening members longitudinally spaced from each other within the belt between two of the elastomerized fabric layers and disposed transverse to the belt, at least a portion of the flexible stiffening members being longitudinally located in a spaced relationship below the cleats 9. The drive track of claim 8 wherein a second series of the flexible stiffening members is localized between one fabric layer and the ground-engaging face with a portion of such second series of flexible stiffening members being longitudinally located in a spaced relationship below the cleats.

10. A drive track comprising in combination a flexible belt having a ground-engaging face and a face adapted to receive driving movement and at least one series of flexible stiffening members spaced from each other within the belt, and disposed transversely to the belt which maintains the ground-engaging face in uniform contact with the ground while simultaneously permitting flexibility, each of said flexible stiffening members comprising a plurality of metal wires which are disposed transversely to the belt and are contained in a metal fabric where such wires constitute the warp of the fabric and are woven together by filler wires having diameters smaller than the warp wires.

* * * * *